US011320293B2

(12) United States Patent
Bartkowiak et al.

(10) Patent No.: US 11,320,293 B2
(45) Date of Patent: May 3, 2022

(54) SENSOR CALIBRATION DEVICE HAVING CONFIGURABLE ELEMENTS

(71) Applicant: Robert Bosch GmbH, Stuttgart (DE)

(72) Inventors: Scott Bartkowiak, Rochester, MN (US); Weston Myer, Blooming Prairie, MN (US)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 16/708,993

(22) Filed: Dec. 10, 2019

(65) Prior Publication Data
US 2021/0172770 A1 Jun. 10, 2021

(51) Int. Cl.
*G01D 11/30* (2006.01)
*G01D 18/00* (2006.01)

(52) U.S. Cl.
CPC ........... *G01D 18/002* (2013.01); *G01D 11/30* (2013.01)

(58) Field of Classification Search
CPC ............................ G01D 18/002; G01D 11/30
See application file for complete search history.

(56) References Cited

U.S. PATENT DOCUMENTS

| | | | |
|---|---|---|---|
| 2017/0003141 A1* | 1/2017 | Voeller | G01S 17/931 |
| 2020/0150224 A1* | 5/2020 | Cejka | G01S 7/412 |
| 2021/0172769 A1* | 6/2021 | Bartkowiak | F16M 11/041 |
| 2021/0173060 A1* | 6/2021 | Bartkowiak | G01S 7/52004 |

FOREIGN PATENT DOCUMENTS

WO WO-2015148830 A1 * 10/2015 ............. G01C 25/00

* cited by examiner

*Primary Examiner* — Jamel E Williams
(74) *Attorney, Agent, or Firm* — David Kovacek; Maginot, Moore & Beck LLP

(57) ABSTRACT

A portable sensor calibration device that provides a reference to a sensor during a calibration procedure. The sensor calibration device may have a number of adjustable functions providing for functional configurability, such as interchangeable target elements, adjustable pitch, adjustable target mounting, and locking elements.

10 Claims, 13 Drawing Sheets

SENSOR CALIBRATION DEVICE HAVING CONFIGURABLE ELEMENTS

TECHNICAL FIELD

This disclosure relates to the calibration of sensors, and in particular sensors of a vehicle utilized for advanced driver assistance functions

BACKGROUND

In vehicles having an Advance Driver Assistance System, the associated sensors require calibration to achieve proper operation. Calibration may be required as part of regular maintenance, or on particular occasions such as the repair or replacement of the windshield or other glass components of the vehicle. Certain repairs may be completed on-site, such as at the vehicle owner's home or place of business. Current calibration tools are typically bulky and stationary, and require the vehicle to be brought into an automotive service center or similar controlled environment for calibration.

It is therefore desirable to have a calibration device that is sufficiently mobile such that the calibration procedure may be performed at a desired location outside of an automotive service center. It is additionally desirable for such a calibration device to be assembled and disassembled for the purpose of storage or travel.

SUMMARY

One aspect of this disclosure is directed to a sensor calibration device comprising a base frame, standing frame, measurement frame, crossbar, target and gliding support. The standing frame may be operable to couple with the base frame, and may comprise a hinge. The measurement frame may be operable to couple to the standing frame. The crossbar may be operable to couple to the measurement frame. The target may be operable to couple to the crossbar. The sensor calibration device may be considered functionally-assembled when the standing frame is coupled to the base frame, the measurement frame is coupled to the standing frame, the crossbar is coupled to the measurement frame, and the target is coupled to the crossbar. One or more of these couplings may be detachable. The gliding support may extend between the standing frame and the base frame, and provide the sensor calibration device with the ability to adjust the pitch of the target with respect to the base frame when the sensor calibration device is functionally-assembled.

Another aspect of this disclosure is directed to a sensor calibration device comprising a base frame, standing frame, measurement frame, mounting bolster, crossbar, and target. The standing frame may be operable to couple with the base frame, and may comprise a hinge. The measurement frame may be operable to couple to the standing frame. The mounting bolster may be operable to couple to the measurement frame. The crossbar may be operable to couple to the mounting bolster. The target may be operable to couple to the crossbar. The sensor calibration device may be considered functionally-assembled when the standing frame is coupled to the base frame, the measurement frame is coupled to the standing frame, the mounting bolster is coupled to the measurement frame, the crossbar is coupled to the mounting bolster and the target is coupled to the crossbar. One or more of these couplings may be detachable.

A further aspect of this disclosure is directed to a sensor calibration device comprising a base frame, standing frame, measurement frame, crossbar, target and handlebar frame. The standing frame may be operable to couple with the base frame, and may comprise a hinge. The measurement frame may be operable to couple to the standing frame. The crossbar may be operable to couple to the measurement frame. The target may be operable to couple to the crossbar. The handlebar frame may be operable to couple to the base frame. The sensor calibration device may be considered functionally-assembled when the standing frame is coupled to the base frame, the measurement frame is coupled to the standing frame, the crossbar is coupled to the measurement frame, the target is coupled to the crossbar, and the handlebar frame is coupled to the base frame. One or more of these couplings may be detachable. The handlebar frame may be operable to apply a braking force suitable to restrict motion of the sensor calibration device when functionally-assembled.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
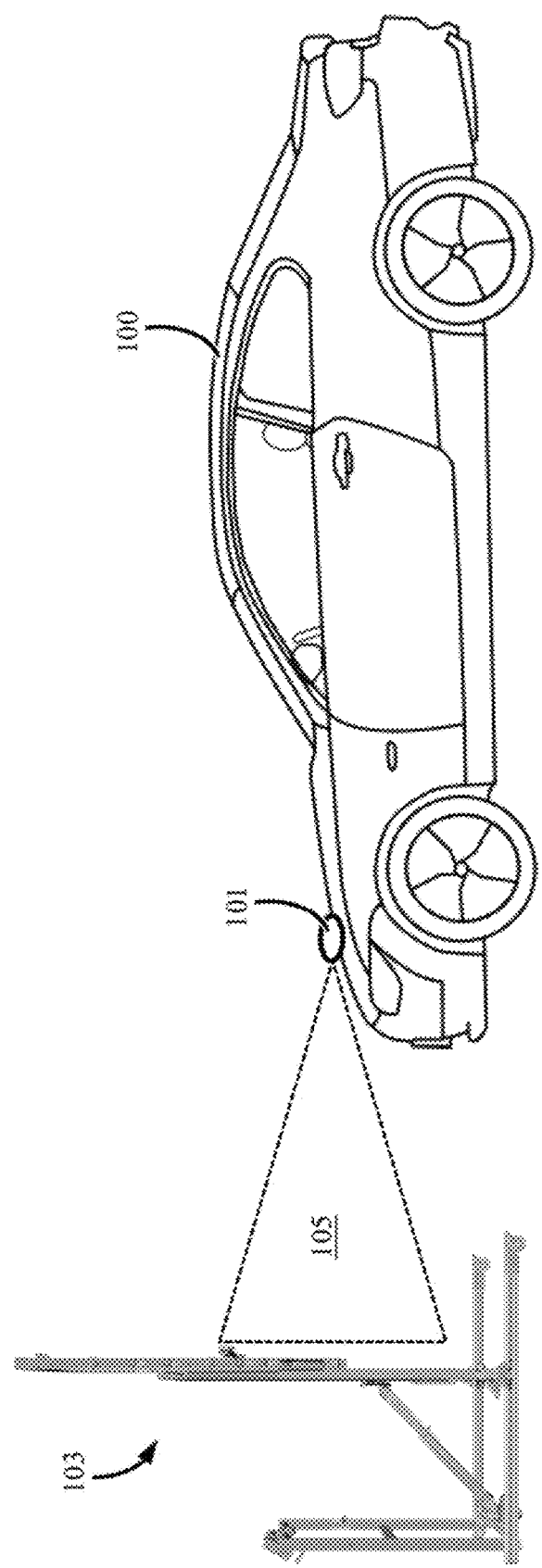
FIG. 1 is an illustration of a vehicle sensor and sensor calibration device daring a sensor calibration.

FIG. 1 shows a vehicle 100 with a sensor 101 under calibration conditions. Calibration utilizes a sensor calibration device 103, which provides a reflective surface suitable for the calibration. During calibration, sensor 103 generates a signal 105 suitable to reflect off the sensor calibration device 103. In the depicted embodiment, sensor 101 may comprise a radar sensor, but other embodiments may comprise an optical sensor, a camera, an ultraviolet sensor, a lidar sensor, an infrared sensor, an ultrasonic sensor, or any other sensor known to one of ordinary skill in the art without deviating from the teachings disclosed herein. In the depicted embodiment, sensor calibration device 103 is used to calibrate the sensor 101 of vehicle 100, but other embodiments may be utilized to calibrate sensors not associated with a vehicle.

Figure 2A:
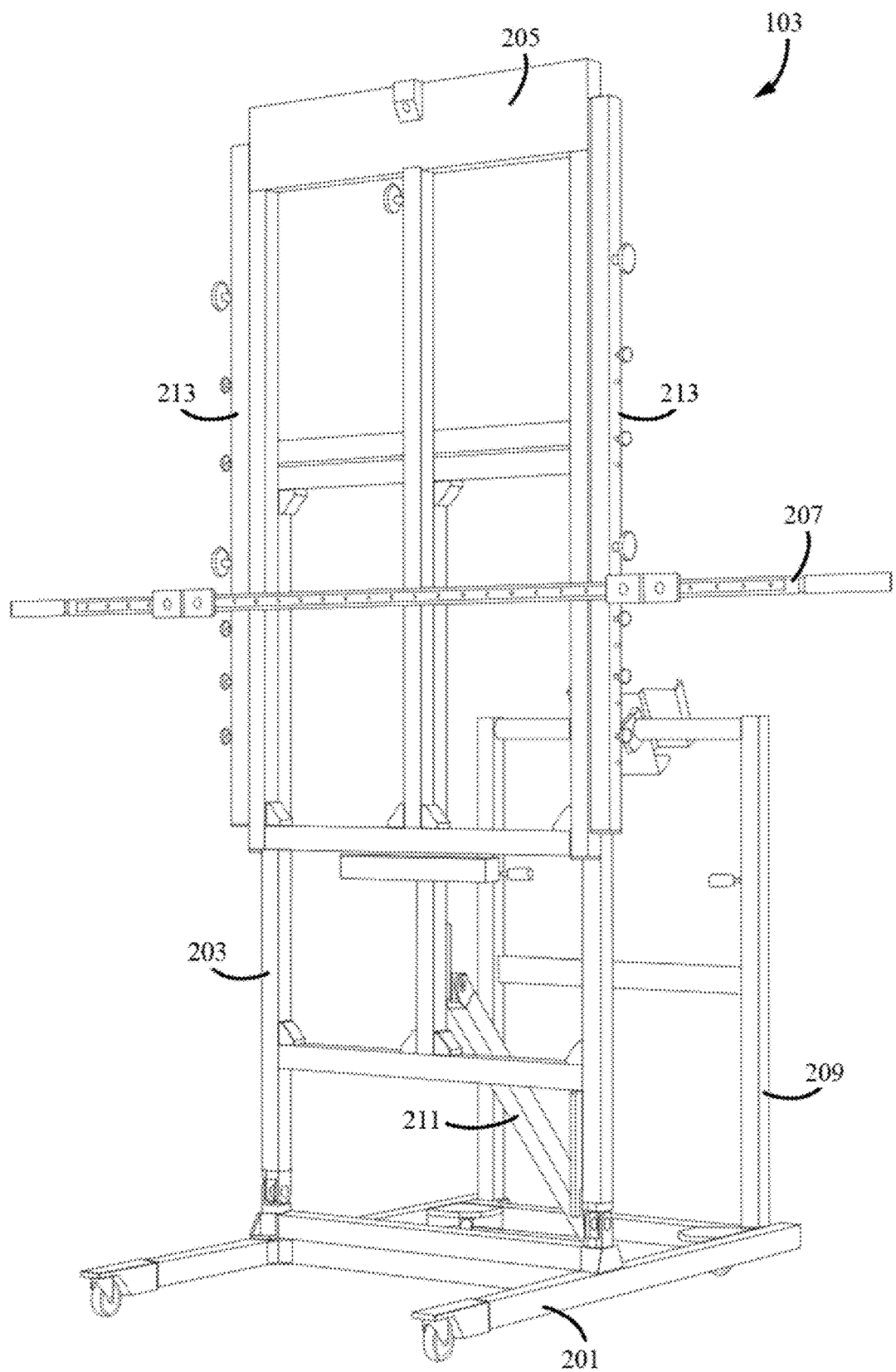
FIG. 2A is an illustration of a sensor calibration device.
Figure 2B:
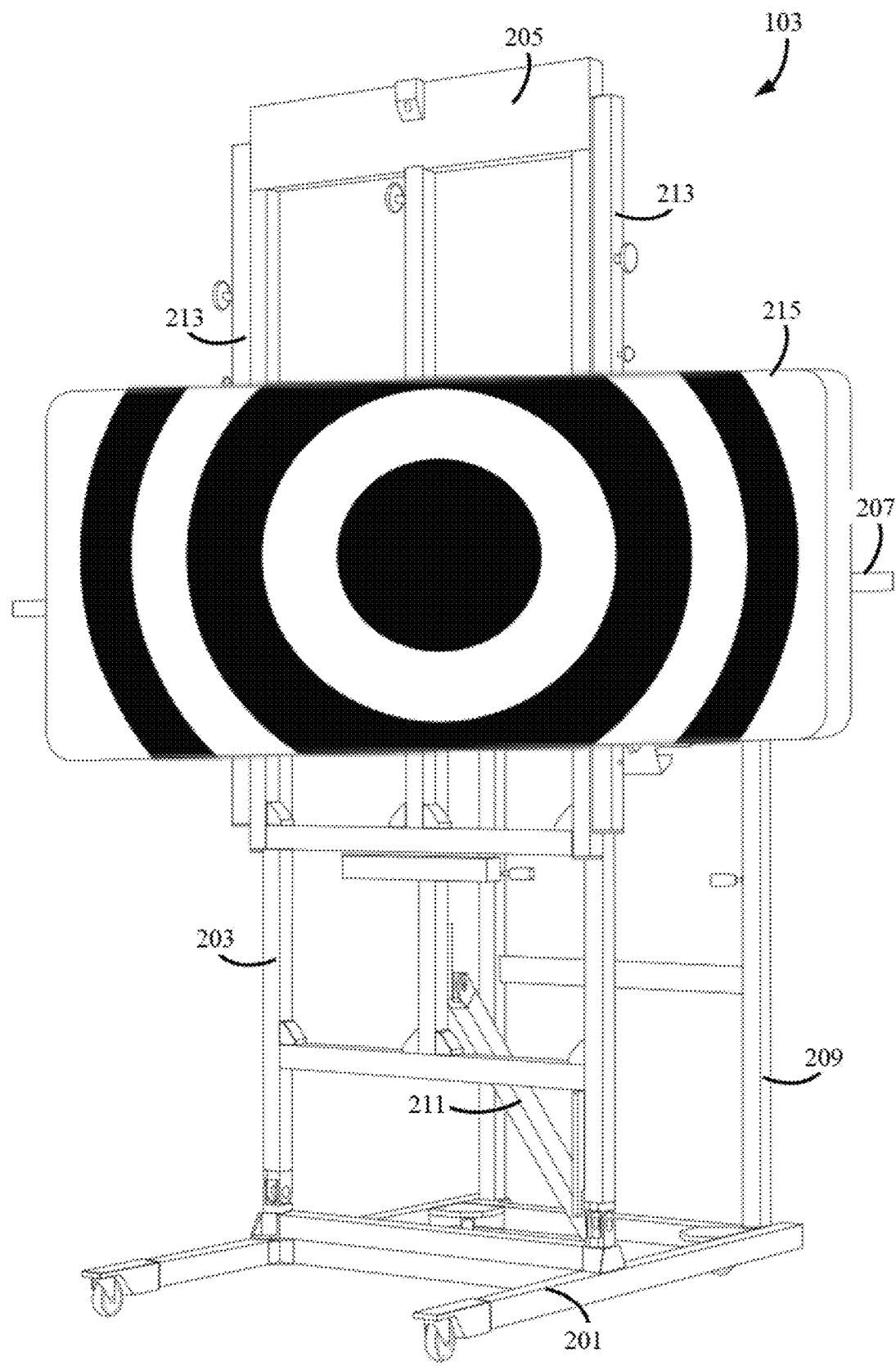
FIG. 2B is an illustration of the sensor calibration device of FIG. 2A with a target element.

FIG. 2A and FIG. 2B show a view of a sensor calibration device 103 in greater detail. FIG. 2A depicts sensor calibration device 103 comprising a base frame 201, a standing frame 203, a measurement frame 205, a crossbar 207, a handlebar frame 209, a glide support 211, and a number of mounting bolsters 213. FIG. 2B provides an additional view of sensor calibration device 103 with the same components as depicted in FIG. 2A, but additionally with a target 215. In the depicted embodiment, sensor calibration device 103 may be disassembled and reassembled for convenience in transport or storage, such as loading a disassembled device into a service, vehicle. Disassembly and assembly may be accomplished via detachable coupling of the elements of sensor calibration device 103.

In the depicted embodiment, standing frame 203 may detachably couple to base frame 201, measurement frame 205 may detachably couple to standing frame 203, crossbar 207 may detachably couple to measurement frame 205, and target 215 may detachably couple to crossbar 207. In the depicted embodiment, mounting bolsters 213 may detachably couple to measurement frame 205 and handlebar frame 209 may detachably couple to base frame 201. In the depicted embodiment, gliding support 211 may extend from base frame 201 to standing frame 203.

In the depicted embodiment, target 215 may provide a reflective surface suitable for calibrating or testing a sensor. The depicted embodiment of target 215 comprises a monochromatic design feature concentric conic sections, but other embodiments may comprise other designs without deviating from the teachings disclosed herein. In some embodiments, target 215 may comprise one or more supports operable to couple or latch to one or more other elements sensor calibration device 103. Such additional supports may be advantageous for embodiments comprising large or heavy configurations of target 215. In some embodiments, sensor calibration device 103 may comprise multiple targets 215 without deviating from the teachings disclosed herein. In such embodiments, some or all of the designs presented by each of targets 215 may be distinct from the other designs without deviating from the teachings disclosed herein. In some embodiments, the design of target 215 may be configurable, which advantageously may provide suitable function of target 215 to be used with a variety of sensor types or specifications. In some embodiments, sensor calibration device 103 may comprise a plurality of interchangeable targets 215, each to be used in different configurations for different sensor types or specifications, without deviating from the teachings disclosed herein.

In the depicted embodiment, when each element is coupled to its associated elements as described above, sensor calibration device 103 may be considered to be "functionally-assembled." In some embodiments, sensor calibration device 103 may be considered to be functionally-assembled provided that the elements are properly coupled to place target 215 in a specified position relative to a sensor without deviating from the teachings disclosed herein. Some embodiments may not utilize handlebar frame 209 without deviating from the teachings disclosed herein. Some embodiments may not utilize one or more of mounting bolsters 213 without deviating from the teachings disclosed herein. Some embodiments may not utilize gliding support 211 without deviating from the teachings disclosed herein. Additional aspects of the elements are discussed below in further detail.

Figure 3:
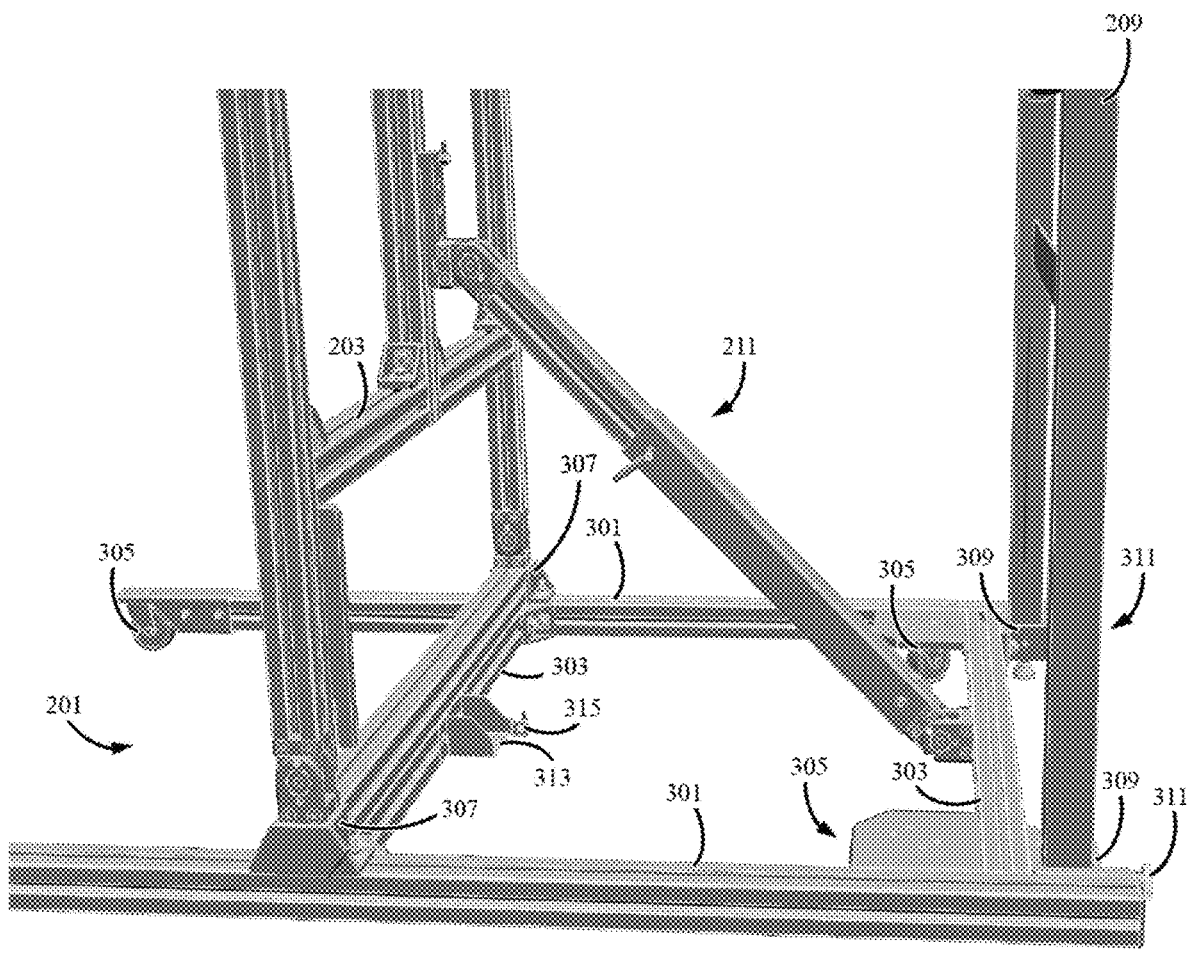
FIG. 3 is an illustration of a glide support between a base frame and standing frame of a sensor calibration device.

FIG. 3 provides a detailed view of base frame 201. Base frame 201 is comprised of primary base members 301 and secondary base members 303. The depicted embodiment comprises a pair of primary base members 301 and a pair of secondary base members 303, but other embodiments may comprise other configurations having a different number of either primary base members 301 or secondary base members 303 without deviating from the teachings disclosed herein. Some embodiments may comprise only a single one of primary base member 301 or secondary base member 303 without deviating from the teachings disclosed herein. In the depicted embodiment, secondary base members 303 are affixed to primary base members 301 at a transverse angle within a specified tolerance, forming a frame comprised of right angles within the specified tolerance. Other embodiments may comprise other configurations without deviating from the teachings disclosed herein.

In the depicted embodiment, base frame 201 comprises a number of wheels 305 coupled to primary base members 301. Wheels 305 may advantageously enhance the mobility of the sensor calibration device, and by proxy enhance the accuracy of placement of the sensor calibration device with respect to the sensor subject to calibration. In the depicted embodiment, the sensor calibration device comprises four wheels 305, but other embodiments may comprise a different number, or a different configuration without deviating from the teachings disclosed herein. Some embodiments may not comprise wheels without deviating from the teachings disclosed herein.

Primary base members 301 are additionally outfitted with a number of first brackets 307 operable to couple base frame 201 and standing frame 203. First brackets 307 are suitable to provide a detachable coupling between base frame 201 and standing frame 203, and thus first brackets 307 may also be referred to as "standing brackets" 307. When coupled via standing brackets 307, standing frame 203 forms a transverse angle within a specified tolerance with both primary base members 301 and secondary base members 303. The angle of standing frame 203 when coupled to base frame 201 may be adjusted using mechanisms of glide support 211 (described later in further detail).

Base frame 201 may additionally comprise a number of second brackets 309 operable to couple handlebar frame 209 to base frame 201. Second brackets 309 are suitable to provide a detachable coupling between base frame 201 and handlebar frame 209, and thus second brackets 309 may also be referred to as "handlebar brackets" 309. When coupled via handlebar brackets 309, handlebar frame 209 forms a transverse angle within a specified tolerance with both primary base members 301 and secondary base members 303. In the depicted embodiment, handlebar brackets 309 comprise sleeve brackets operable to receive member-components of handlebar bracket 309, but other embodiments may comprise other configurations without deviating from the teachings disclosed herein. In the depicted embodiment, each of handlebar brackets 309 may comprise a handlebar frame lock operable to retain, handlebar bracket 209 in the coupled configuration with base frame 201. In, the depicted embodiment, handlebar frame locks 311 may comprise a screw-lock configuration, but other embodiments may comprise different configurations without deviating from the teachings disclosed herein, Some embodiments may comprise a different number or arrangement of handlebar frame locks 311 without deviating from the teachings disclosed herein. Some embodiments may not comprise a handlebar frame lock without deviating from the teachings disclosed herein.

Disassembly of the sensor calibration device may be supported by features designed to enhance portability and storability of the device. In the depicted embodiment, base frame 201 further comprises a glide support cradle 313 operable to provide support for glide support 211 when the sensor calibration device is disassembled. Glide support cradle 313 can advantageously enhance portability of the sensor calibration device by retaining glide support 211 in a compact arrangement, thereby permitting a user to more easily store or transport base frame 201. In the depicted embodiment, glide support cradle comprises a glide support lock 315 operable to retain one end of glide support 211 in a coupled arrangement with glide support cradle 313. Some embodiments may comprise different configurations of glide support cradle 313 without deviating from the teachings disclosed herein. Some embodiments may not comprise a glide support cradle without deviating from the teachings disclosed herein.

Figure 4A:
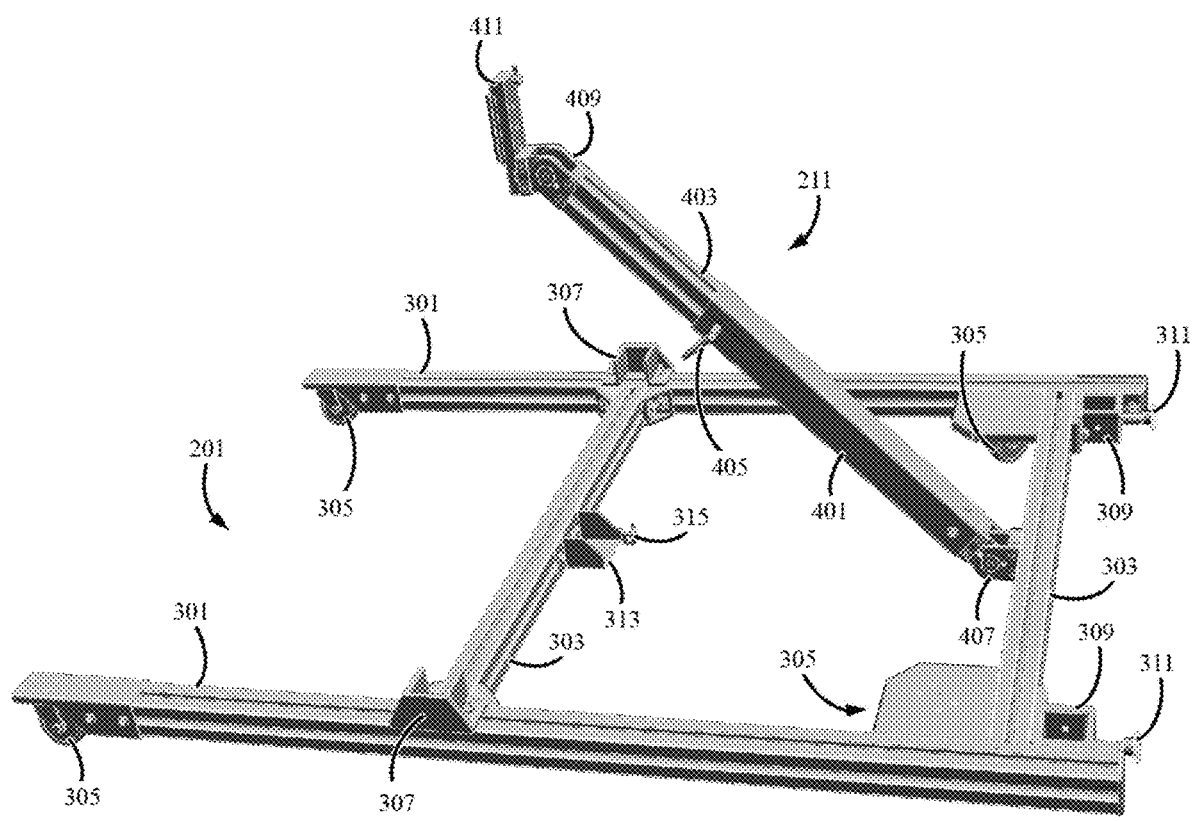
FIG. 4A is an illustration of a glide support and base frame of a sensor calibration device.

FIG. 4A provides an alternative view of base support 201 and glide support 211. In the depicted embodiment, glide support 211 comprises a sleeve member 401 and an internal member 403. The longitudinal length of glide support 211 may be adjusted by changing the relative arrangement of internal member 403 with respect to sleeve member 401. In the depicted embodiment, internal member 403 may slide in and out of sleeve member 401 along the longitudinal dimension of sleeve member 401. This sliding adjustment may be utilized to adjust the longitudinal length of glide support 211. Adjustment of the longitudinal length of glide support 211 may advantageously provide a user control of the pitch of standing frame 203 relative to base frame 201. This may advantageously provide user control of the pitch of measurement frame 205 and subsequently target 215 with respect to base frame 201, such as during a calibration.

The longitudinal length of glide support 211 may be fixed using a sleeve lock 405. Sleeve lock 405 may be operable to fix the relative arrangement of internal member 403 with respect to sleeve member 401, and thus fix the longitudinal length of glide support 211. In the depicted embodiment, sleeve lock 405 comprises a screw lock configuration, but other embodiments may comprise other configurations without deviating from the teachings disclosed herein.

Glide support 211 may be configured to extend between base frame 201 and standing frame 203 (1101 shown, see FIG. 3). Because glide support 211 is configured to have an adjustable longitudinal length, the angle of the extended glide support 211 may be adjustable to accommodate the differences in length. Glide support 211 comprises a hinge at each end, each hinge operable to enhance extension between base frame 201 and standing frame 203, In the depicted embodiment, the hinges may comprise a base-side hinge 407 and a standing-side hinge 409. Other embodiments may comprise other configurations without deviating from the teachings disclosed herein.

In the depicted embodiment, base-side hinge is affixed to one of the secondary base members 303. Glide support 211 may be detachably coupled to standing frame 203, via a standing-side latch 411. Standing-side latch 411 may be operable to detachably couple the standing-side hinge 409 to standing frame 203.

Figure 4B:
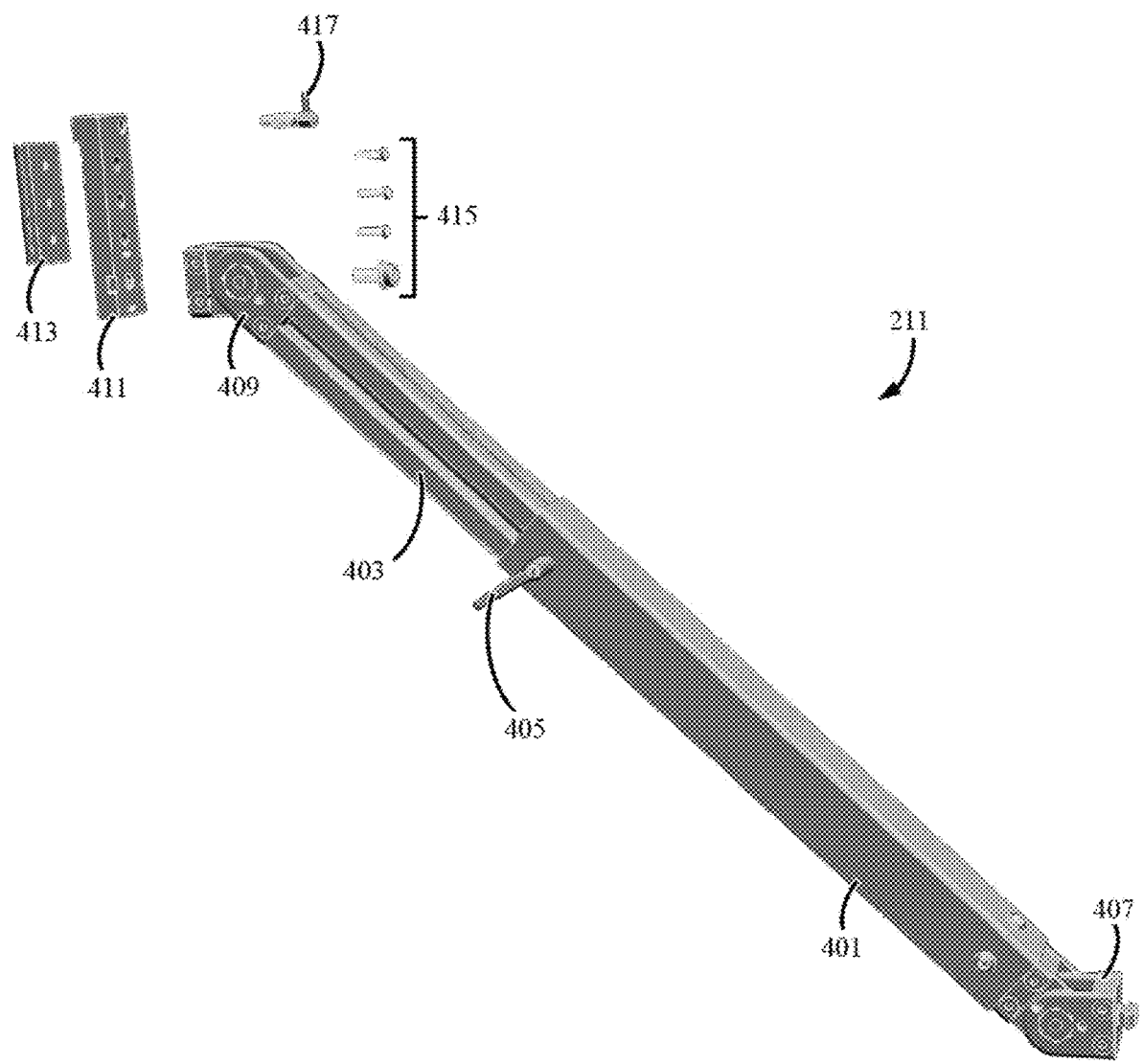
FIG. 4B is an exploded view of a glide support of a sensor calibration device.

FIG. 4B illustrates an exploded view of glide support 211, providing additional close-up details of the coupling mechanism between glide support 211 and standing frame 203. In particular, FIG. 4B provides additional details showing how standing-side latch 411 couples to standing frame 203. Standing-side latch 411 is configured to latch itself to a slider mount 413, which may be affixed to standing frame 203 (not pictured, see FIG. 3). In some embodiments, slider mount 413 may be adjustably affixed to standing frame 203, and operable to be adjustably positioned at various points along the longitudinal length of standing frame 203. In the depicted embodiment, the coupling of standing-side latch 411 to slider mount 413 is achieved using a number of latch pins 415, but other embodiments may comprise other configurations without deviating from the teachings disclosed herein. In the depicted embodiment, glide support 211 may utilize a lock pin 417 to retain glide support 211 in a particular arrangement with respect to standing frame 203, but other embodiments may comprise other configurations without deviating from the teachings disclosed herein. In the depicted embodiment, lock pin 417 comprises a screw lock configuration, but other embodiments may comprise other configurations without deviating from the teachings disclosed herein.

Figure 5:
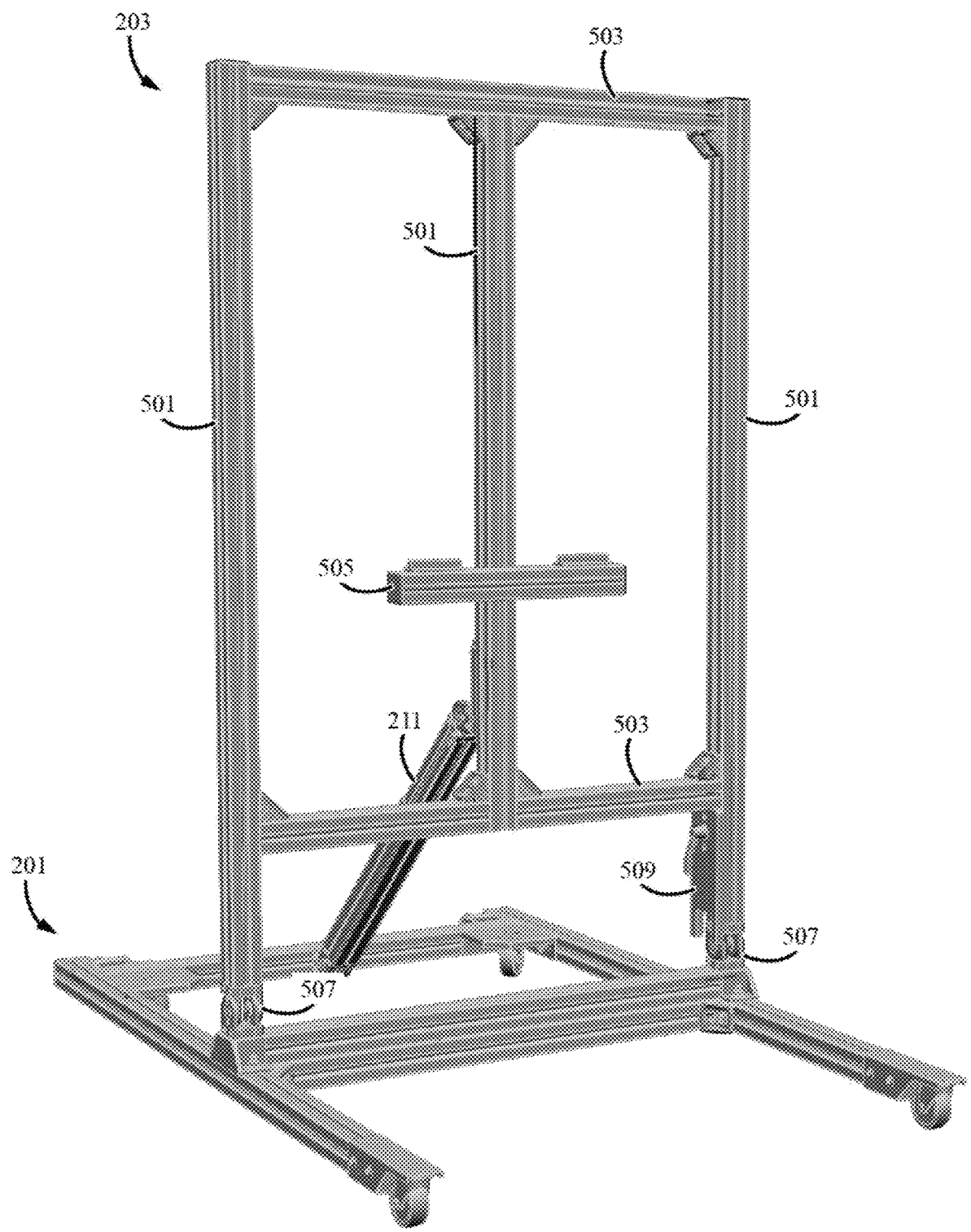
FIG. 5 is an illustration of a standing frame of a sensor calibration device.

FIG. 5 depicts a view of standing frame 203 in context while coupled to base frame 203 and gliding support 211. Standing frame 203 is comprised of primary standing members 501 and secondary standing members 503. The depicted embodiment comprises a pair of primary standing members 501 and a pair of secondary standing members 503, but other embodiments may comprise other configurations having a different number of either primary standing members 501 or secondary standing members 503 without deviating from the teachings disclosed herein. Some embodiments may comprise only a single one of primary standing member 501 or secondary standing member 503 without deviating from the teachings disclosed herein. In the depicted embodiment, secondary standing members 503 are affixed to primary standing members 501 at a transverse angle within a specified tolerance, forming a frame comprised of right angles within the specified tolerance. Other embodiments may comprise other configurations without deviating from the teachings disclosed herein.

Standing frame 203 additionally comprises a measurement mount 505, operable to detachably couple standing frame 203 and measurement frame 205 (rot pictured, see FIG. 2A). In the depicted embodiment measurement mount 505 comprises a number of mounting slots operable to engage with measurement frame 205, but other embodiments may comprise other configurations without deviating from the teachings disclosed herein. In the depicted embodiment, measurement mount 505 is affixed to one of primary standing members 501 in a transverse direction to the primary standing member 501 within a specified tolerance, but other embodiments may comprise other configurations or arrangements without deviating from the teachings disclosed herein. In some embodiments, measurement mount 505 may be replaced by a secondary standing member 503 having particular mounting features without deviating from the teachings disclosed herein.

Standing frame 203 additionally comprises a number of hinges 507, each of hinges operable to engage with standing brackets 307 (see FIG. 3, FIG. 4A) to couple standing frame 203 to base frame 201. Hinges 507 are additionally operable to adjust the relative pitch of standing frame 203 with respect to base frame 201. When the sensor calibration device is functionally-assembled, this pitch adjustment effectively adjusts the pitch of target 215 (see FIG. 2B). Because stabilization of this pitch angle is desirable for a reliable calibration measurement, the pitch of standing frame 203 may be stabilized by glide support 211 and a pitch lock 509. Pitch lock 509 may be operable to provide a first stabilization of the pitch of standing frame 203, and gliding support 211 may be utilized to provide an additional stabilization of the pitch. In some embodiments, hinges 507 may be operable to provide standing frame 203 with extended pitch motion, such as up to 180 degrees of motion with respect to base frame 201 without deviating from the teachings disclosed herein. Such ranges of motion may advantageously enhance the utility of sensor calibration device on uneven or inclined surfaces during calibration.

Figure 6:
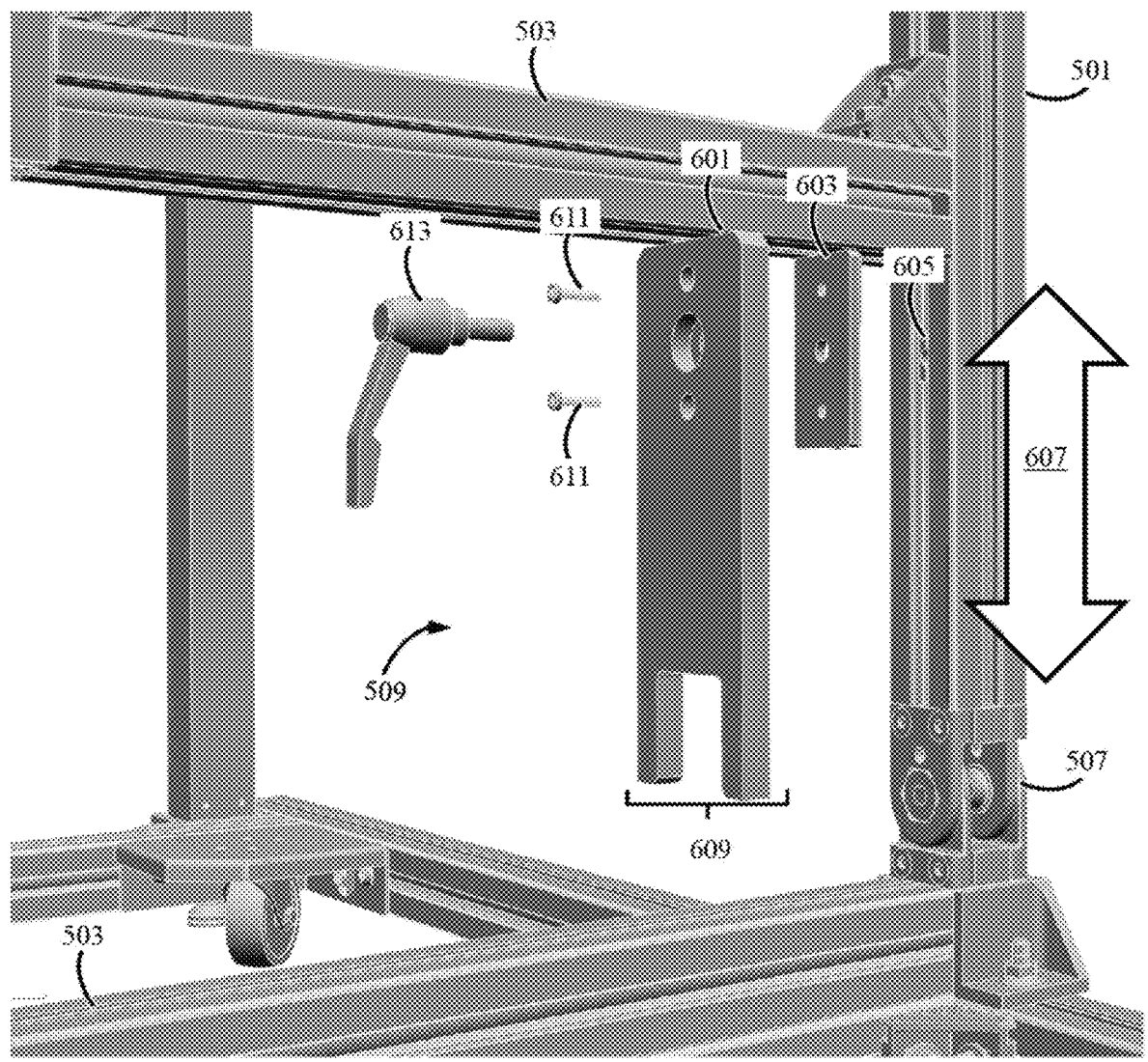
FIG. 6 is an exploded view of a pitch lock associated with a standing frame of a sensor calibration device.

FIG. 6 presents a close-up and exploded view of pitch lock 509 in context with respect to standing frame 203 (see FIG. 5B). Pitch lock 509 is comprised of a locking member 601, joining member 603, and lock mount 605. Lock mount 605 may be embodied as a slider within a primary standing member 501, operable to provide a mounting position for pitch lock 509. Joining member 603 may provide a friction force to hold pitch lock 509 in place. When joining member 603 is not engaged, pitch lock 509 may be operable to be adjustably positioned along an axis 607 of primary standing member 501. Locking member 601 further comprises locking tines 609 operable to engage secondary standing member 503, and restrict the motion of hinge 507. Locking Member 601 may be moved away from the secondary standing member 503 along axis 607 to disengage the locking tines 609. Locking member 601 and joining member 603 may be coupled to each other using a number of joining pins 611. Locking member 601 and joining member 603 may be coupled to lock mount 605 using a locking pin 613. Locking pin 613 may be configured to permit removal by hand in order to advantageously permit convenient adjustment of pitch lock 509 between engaged and disengaged states.

Figure 7A:
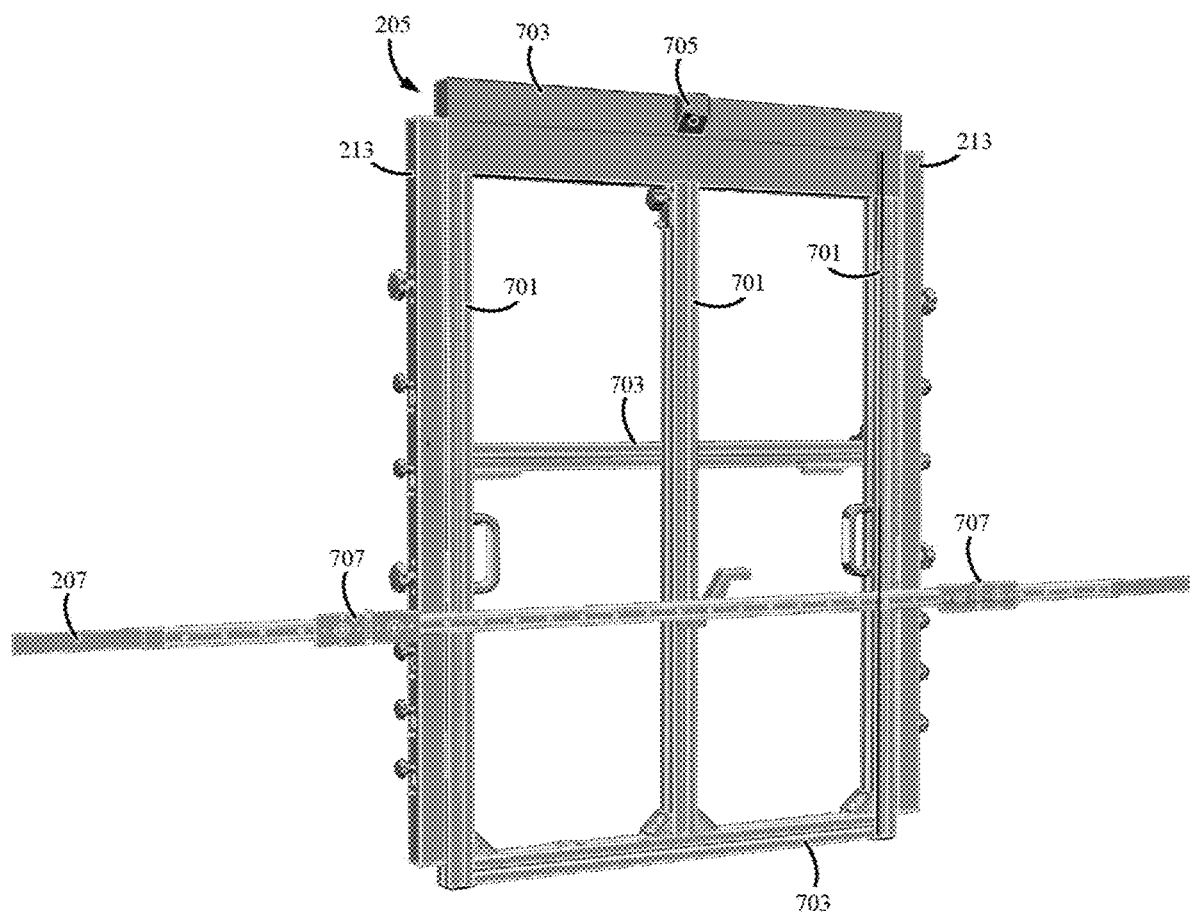
FIG. 7A is an illustration of a measurement frame, mounting bolsters, and a crossbar of a sensor calibration device.

FIG. 7A is an illustration of measurement frame 205 when coupled with mount bolsters 213 and crossbar 207. Measurement frame 205 is comprised of primary measurement members 701 and secondary measurement members 703. The depicted embodiment comprises a trio of primary measurement members 701 and a trio of secondary measurement members 703, but other embodiments may comprise other configurations having a different number of either primary measurement members 701 or secondary measurement members 703 without deviating from the teachings disclosed herein. Some embodiments may comprise only a single one of primary measurement member 701 or secondary measurement member 703 without deviating from the teachings disclosed herein. In the depicted embodiment, secondary measurement members 703 are affixed to primary measurement members 701 at a transverse angle within a specified tolerance, forming a frame comprised of right angles within the specified tolerance. Other embodiments may comprise other configurations without deviating from the teachings disclosed herein.

In the depicted embodiment, measurement frame 205 further comprises an alignment sensor 705 operable to make measurements of the position or relative angle of the sensor calibration device when functionally-assembled. In the depicted embodiment, alignment sensor 705 may comprise a camera, but other embodiments may comprise an optical, sensor, radar sensor, lidar sensor, laser meter, ultrasonic sensor, or any other sensor known to one of ordinary skill in the art without deviating from the teachings disclosed herein. In the depicted embodiment, alignment sensor 705 may be operable to interface with a computing device to provide a visual indication to a user of whether the sensor calibration device may be properly positioned.

By way of example, and not limitation, the computing device may be operable to display the data obtained by alignment sensor 705 as an image overlaid with a silhouette of the vehicle under calibration. The user may adjust the position and relative angle of the functionally-assembled sensor calibration device with respect to the vehicle (such as vehicle 100, see FIG. 1) until the image of the vehicle and the silhouette overlap to within a specified tolerance. Other embodiments may comprise other examples of how alignment sensor 705 may be used to make measurements relevant to position the sensor calibration device during calibration.

In the depicted embodiment, alignment sensor 705 may interface with a computing device via a wired connection, such as a universal serial bus (USB) connection. Such wired connections may advantageously provide power to the alignment sensor 705 from the computing device during connected interface. The connection between alignment sensor 705 and a computing device may comprise a TCP/IP connection, a local area network (LAN) connection, a plain-old-telephone-service (POTS) connection, an Internet protocol connection, an electrical wiring, a conductive channel, an electrical bus, a fiber optic pathway, or any other alternative embodiment known to one of ordinary skill in the art without deviating from the teachings disclosed herein. In some embodiments, alignment sensor 705 may instead connect to computing devices using a wireless connection. Alignment sensor 705 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art without deviating from the teachings disclosed herein.

Crossbar 207 comprises a number of target mounts 707, operable to couple to a target 215 (not shown, see FIG. 2B). In the depicted embodiment, target mounts 707 may be operable to engage magnetic pins of a target, but other embodiments may comprise other mounting configurations without deviating from the teachings disclosed herein. In the depicted embodiment, target mounts 707 may be adjustably positioned along the length of crossbar 207, which may advantageously increase compatibility of the sensor calibration device with a wider variety of target configurations. Some embodiments may have a different number of target mounts 707 without deviating from the teachings disclosed herein.

Mounting brackets 213 may be operable to provide additional support to crossbar 207 in coupling with measurement frame 205 and supporting target 215 (not shown). In the depicted embodiment, mounting brackets 213 may comprise a magnetic surface suitable for a magnetic coupling with crossbar 207, but other embodiments may comprise other configurations without deviating from the teachings disclosed herein.

Figure 7B:
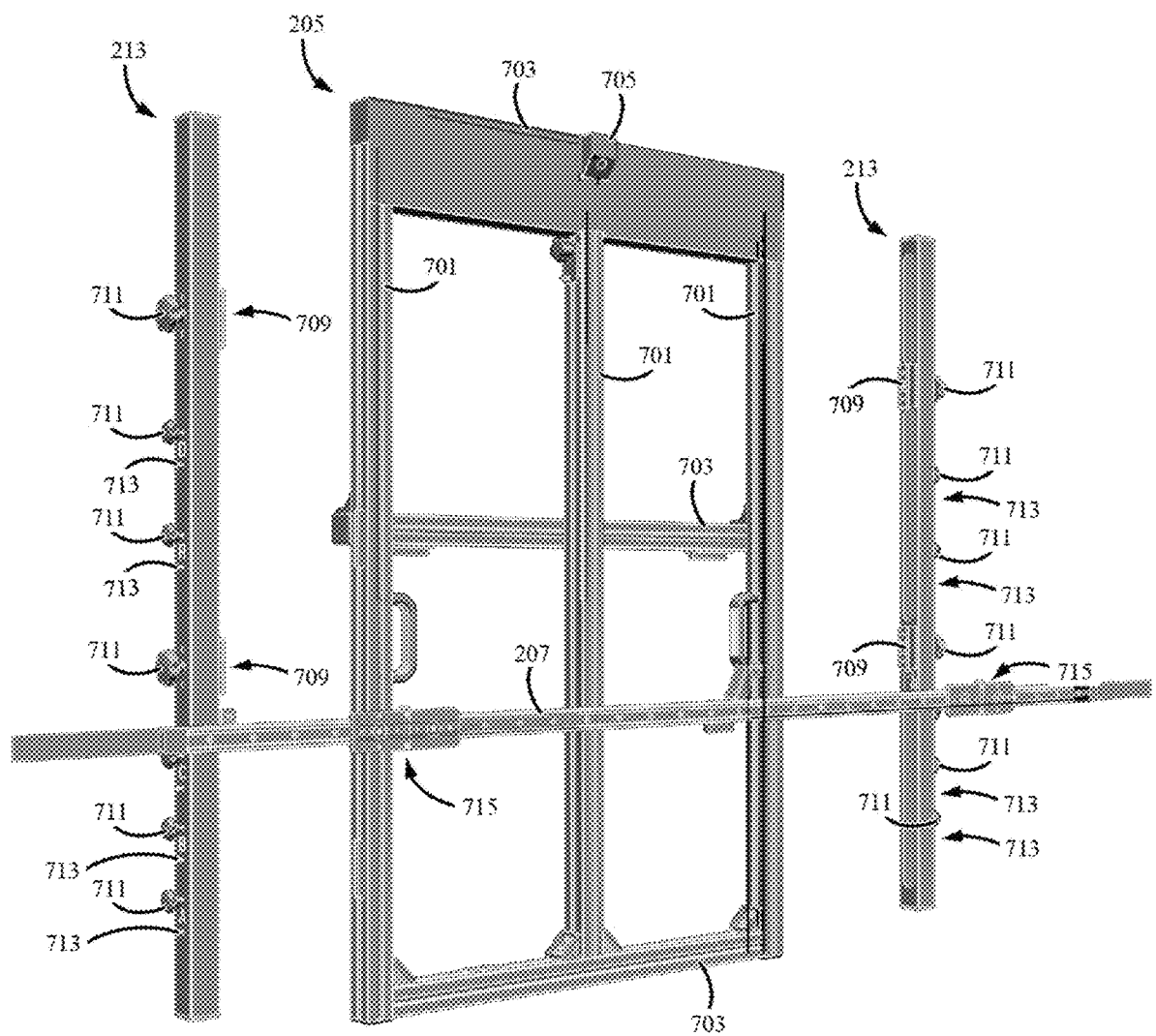
FIG. 7B is an exploded view of a measurement frame, mounting bolsters, and a crossbar of a sensor calibration device.

FIG. 7B provides an alternate view of measurement frame 205, mounting bolsters 213, and crossbar 207. FIG. 7B in particular provides an exploded view showing particular elements utilized for coupling of the components. In particular, mounting bolsters 213 may comprise a number of mounting latches 709 and mount pins 711. Mounting latches 709 may be operable to engage the coupling between a mounting bolster 213 and measurement frame 205. The coupling of a mounting bolster 709 may be adjustable with respect to primary measurement member 701, advantageously enabling a greater variety of arrangements suitable for a functionally-assembled sensor calibration device. The depicted embodiment utilizes two mounting bolsters 213, but other embodiments may comprise other configurations without deviating from the teachings disclosed herein. In the depicted embodiments, the relative arrangement of mounting bolsters 213 may be symmetrical with respect to measurement frame 205, or may be asymmetrical or otherwise irregular without deviating from the teachings disclosed herein. This configurability of the arrangement of mounting bolsters 213 may advantageously permit a greater variety of configurations of the sensor calibration device that is functionally-assembled to comply with a specified configuration in compliance with a variety of sensors.

Mount pins 711 may be operable to provide support to the coupling of mounting bolsters 213 and measurement frame 205. Mount pins 711 may provide additional force to stabilize the coupling of a mounting bolster 213 to measurement frame 205, which may advantageously enable the sensor calibration device to accommodate larger and heavier targets in a functionally-assembled arrangement. In the depicted embodiment, mount pins 711 comprise a plurality of pins having a screw configuration, but other embodiments may comprise other configurations without deviating from the teachings disclosed herein. In some embodiments, a different number of mount pins 711 may be present without deviating from the teachings disclosed herein. In some embodiments, different ones of mount pins 711 may have distinct configurations without deviating from the teachings disclosed herein. Some embodiments may not comprise mount pins 711 without deviating from the teachings disclosed herein.

Mounting bolsters 213 may further comprise a number of support pins 713. Each of support pins 713 may be operable to provide additional mounting support to a target, such as target 215 (not shown; see FIG. 2). This additional support may advantageously enable the sensor calibration device to accommodate larger and heavier targets in a functionally-assembled arrangement. In particular, the additional support providing by a support pin 713 reduces the total weight assumed by target mounts 707, and by crossbar 207. Embodiments of mounting bolsters 213 having mount pins 711 and support pins 713 may alternatively be referred to as "hirschgeweih."

Also depicted in FIG. 7B are crossbar mounts 715, operable to couple crossbar 207 to measurement frame 205. In the depicted embodiment, crossbar mounts 715 may be operable to mount crossbar 207 to measurement frame 205 directly, or to one or more surfaces of mounting bolsters 213 when mounting bolsters 213 are coupled to measurement frame 205. In the depicted embodiment, crossbar mounts 715 may be operable to enable an adjustable coupling of crossbar 207. In the depicted embodiment, crossbar mounts 715 may comprise a magnetic coupling mechanism, but other embodiments may comprise other configurations without deviating from the teachings disclosed herein.

Figure 8A:
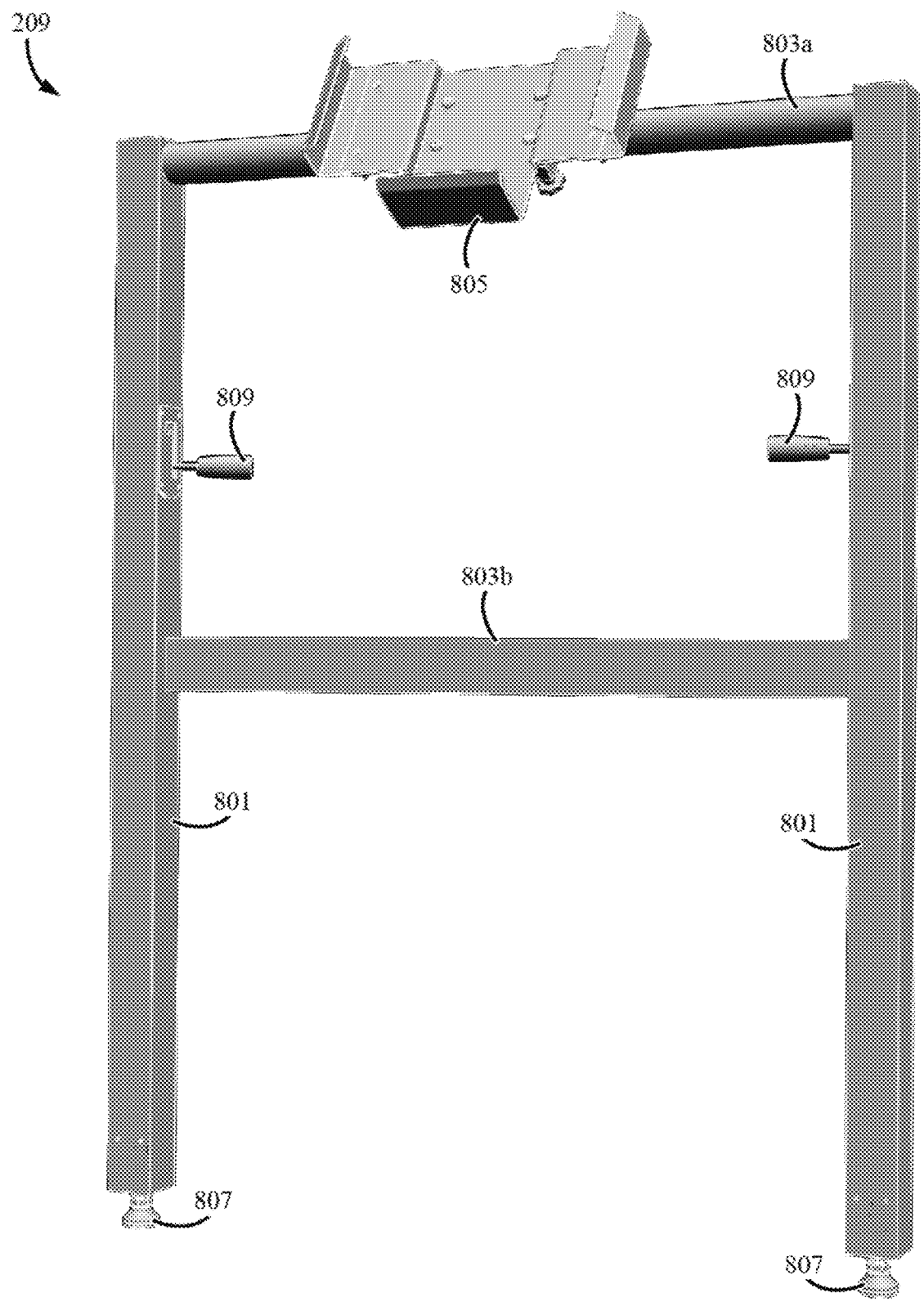
FIG. 8A is an illustration of a handlebar frame of a sensor calibration device.

FIG. 8A is an illustration of handlebar frame 209 in greater detail. Handlebar frame 209 is comprised of primary handlebar members 801 and secondary handlebar members 803. The depicted embodiment comprises a pair of primary handlebar members 801 and a pair of secondary handlebar members 803, but other embodiments may comprise other configurations having a different number of either primary handlebar members 801 or secondary handlebar members 803 without deviating from the teachings disclosed herein. Some embodiments may comprise only a single one of primary handlebar member 801 or secondary handlebar member 803 without deviating from the teachings disclosed herein. In the depicted embodiment, secondary handlebar members 803 are affixed to primary handlebar members 801 at a transverse angle within a specified tolerance, forming a frame comprised of right angles within the specified tolerance. Other embodiments may comprise other configurations without deviating from the teachings disclosed herein.

In the depicted embodiment, primary handlebar members 801 are configured to engage a handlebar bracket 309 of the sensor calibration device when functionally-assembled (see FIG. 3). In the depicted embodiment, primary handlebar members 801 are compatible with handlebar frame locks 311 (see FIG. 3). Other embodiments may comprise different configurations without deviating from the teachings disclosed herein. In some embodiments, the functionally-assembled sensor calibration device may not comprise one or more of the handlebar brackets 309 or handlebar frame locks 311 without deviating from the teachings disclosed herein.

In the depicted embodiment secondary handlebar members 803 may comprise two different configurations, with secondary handlebar member 803a having a cylindrical shape and secondary handlebar member 803b having shape comprising a rectangular cross section. Other embodiments may comprise other configurations having additional or other cross sections without deviating from the teachings disclosed herein. The cylindrical shape of secondary handlebar member 803a may advantageously provide an ergonomic gripping surface for a user to position the sensor calibration device when functionally-assembled. In some embodiments, some or all of secondary handlebar members 803 may comprise distinct shapes without deviating frons the teachings disclosed herein.

In the depicted embodiment, secondary handlebar member 803a is coupled with a tablet mount 805, operable to effectively couple a tablet computing device (not shown), to handlebar frame 209. This coupling may advantageously provide a user access to the functions of a tablet computing device during utilization of the sensor calibration device in an ergonomic fashion while enabling the user to keep their hands free for other tasks. The tablet computing device may be operable to perform functions pertaining to the setup and utilization of the sensor calibration device when functionally-assembled. By way of example, and not limitation, the table computing device may be configured to digital communication with other elements of the sensor calibration device, such as alignment sensor 705 (see FIG. 7). Though the depicted embodiment comprises a tablet mount 805 specifically configured to interact with a tablet computing device, other embodiments may comprise other mounts suitable for other processing devices without deviating from the teachings disclosed herein. In such embodiments, the associated computing device may comprise a mobile processing device, a smartphone, a laptop computer, a personal digital assistant (PDA) device, a handheld processor device, a specialized processor device, a portable terminal in communication with a system of processors distributed across a network, or any other alternative embodiment known to one of ordinary skill in the art. Some embodiments may not comprise a tablet mount 805 without deviating from the teachings disclosed herein.

Handlebar frame 209 further comprises a number of foot locks 807, operable to restrict motion of the sensor calibration device when functionally-assembled. In the depicted embodiment, handlebar frame 209 comprises a pair of foot locks 807, but other embodiments may comprise a different number without deviating from the teachings disclosed herein. Some embodiments of the sensor calibration device may not have foot locks without deviating from the teachings disclosed herein.

Foot locks 807 may be operable to apply a friction force to a supporting surface of the sensor calibration device (e.g., the ground, or a floor). When the sensor calibration device is functionally-assembled, the friction force applied by foot locks 807 may be sufficient to restrict normal free motion of the sensor calibration device, such as the rolling of wheels 305 (see FIG. 3).

In the depicted embodiment, foot locks 807 may be selectively engaged with the supporting surface, permitting the user to selectively restrict motion of the sensor calibration device when functionally assembled. The selective restriction of motion may be controlled by a user via number of lock handles 809. Each of lock handles 809 may comprise a number of positions corresponding to a level of motion restriction behavior of an associated foot lock 807. In the depicted embodiment, lock handles 809 may be independently controlled to selectively adjust an associated foot lock 807, but other embodiments may comprise a configuration having combined lock handle behaviors. In the depicted embodiment, handlebar frame 209 comprises a pair of lock handles 809, but other embodiments may comprise a different number of lock handles without deviating from the teachings disclosed herein.

Figure 8B:
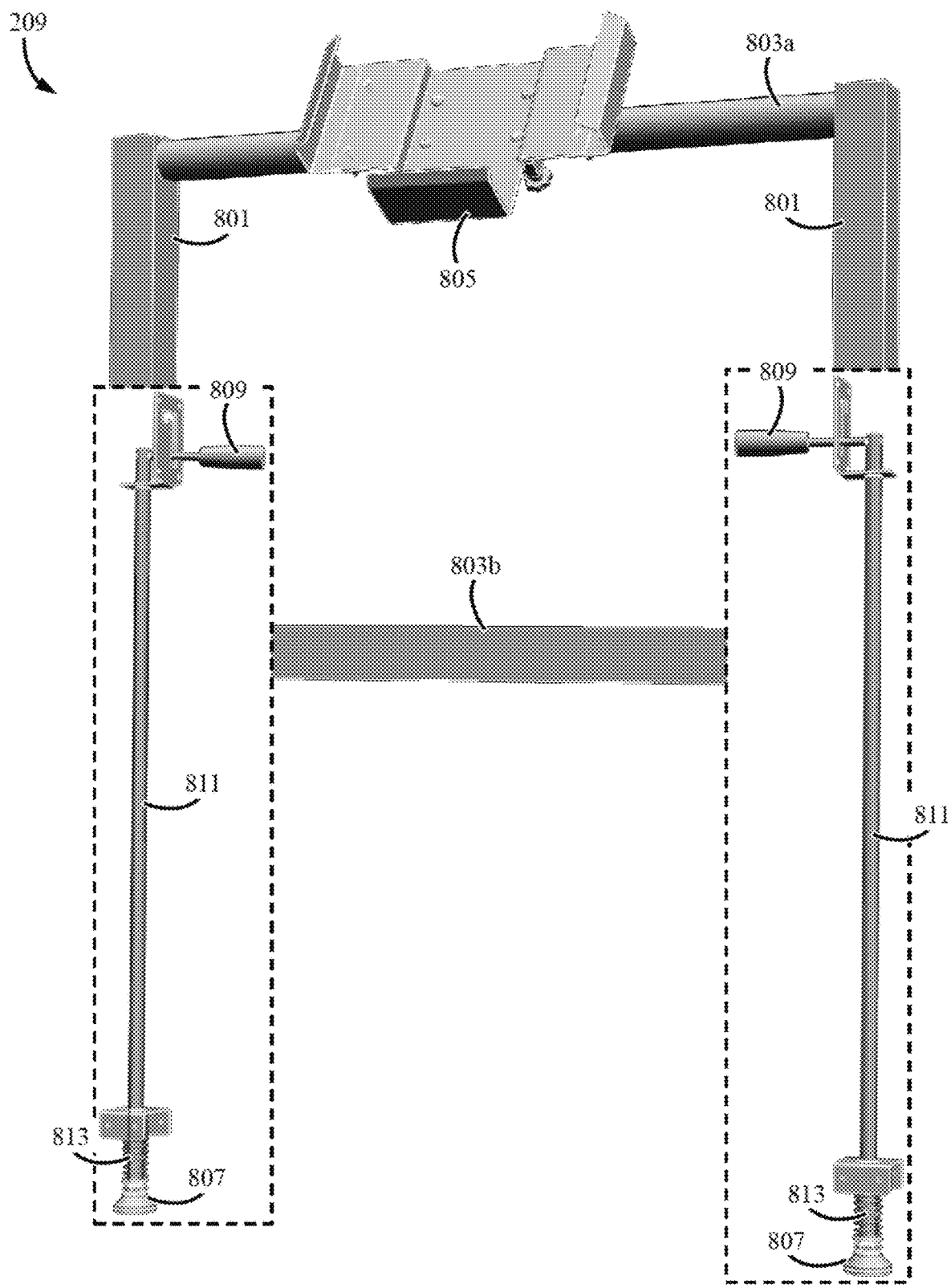
FIG. 8B is an illustration of a handlebar frame of a sensor calibration device with a cutout view illustrating some elements thereof.

FIG. 8B depicts handlebar frame 209 with a cutaway view of the interiors of primary handlebar members 801, showing additional details of the functional components of foot locks 807. Foot lock 807 is connected to lock handle 809 via a lock column 811 disposed within primary handlebar member 801, such that motion of the lock handle 809 will correlate with motion of the foot lock 807. In the depicted embodiment, lock column 811 is disposed within primary handlebar member 801, but other embodiments may be partially-disposed or otherwise-disposed with respect to handlebar frame 299 without deviating from the teachings disclosed herein.

To provide friction force with the supporting surface, foot lock 807 is subjected to a force from a spring 813. The force exerted by spring 813 may be controlled by adjusting the position of lock handle 809 such that the extension of lock column 811 within primary handlebar member 801 is affected. Spring 813 may be configured to provide a force sufficient to restrict motion of the sensor calibration device when functionally-assembled. Such force may be specified in response to factors such as the expected coefficient of friction of specified supporting surfaces, the maximum weight of the sensor calibration device when functionally-assembled, and other expected forces that may contribute to motion of the sensor calibration device (e.g., wind or gravitational forces, or expected forces from a user pushing or pulling on the sensor calibration device). In some embodiments, spring 813 may have adjustable configurations affecting to specified forces, which advantageously may enable foot lock 807 to have optimized utility in a variety of configurations of the sensor calibration device (e.g., with different configurations of a target).

Figure 8C:
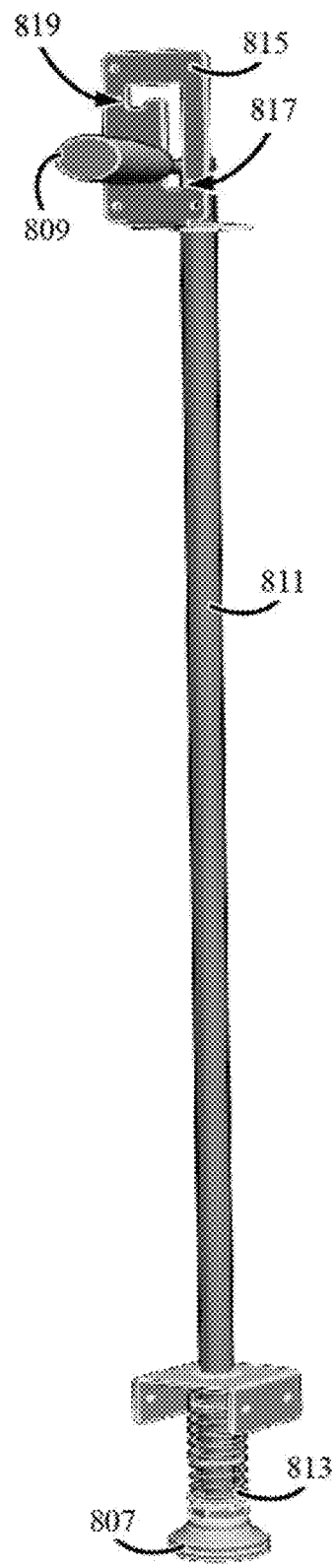
FIG. 8C is a detailed view of locking components of a handlebar frame of a sensor calibration device.

FIG. 8C provides a more detailed view of the internal components of primary handlebar member 801 (see FIG. 8A). The selective control of foot lock 807 may be achieved based upon a position of the lock handle 809 with respect to a lock handle plate 815. In the depicted embodiment, lock handle plate 815 comprises a channel operable to guide the selective position of lock handle 809. In the depicted embodiment, lock handle plate 815 may comprise a first position 817 and a second position 819. When lock handle 809 is moved to the first position 817, lock column 811 is in an extended position, allowing spring 813 to provide force to foot lock 807, engaging foot lock 807 with the supporting surface. When lock handle 809 is moved to the second position 819, lock column 811 is in a contracted position, forcing spring 813 to compress, and disengaging foot lock 807 from the supporting surface. In the depicted embodiment, lock handle plate 815 is affixed to a primary handlebar member 801, but other embodiments may comprise other configurations without deviating from the teachings disclosed herein. In the depicted embodiment, lock handle plate 815 comprises two positions, but other embodiments may comprise a different number of positions without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A sensor calibration device comprising:
a base frame comprising a primary base member and a secondary base member transversely affixed to, the primary base member within a specified tolerance, the base frame further comprising a first bracket and a second bracket;
a standing frame operable to couple with the base frame by engaging the first bracket, the standing frame comprising a hinge, a primary standing member, and a secondary standing member transversely affixed to the primary standing member within a specified tolerance;
a measurement frame comprising a primary measurement member and a secondary measurement member transversely affixed to the primary standing member within a specified tolerance, the measurement frame operable to couple to the standing frame such that the primary measurement member is substantially parallel to the primary standing member within a specified tolerance;
a crossbar configured to detachably couple to the measurement frame, the crossbar transverse to the primary measurement member within a specified tolerance when coupled;
a target configured to detachably couple to the crossbar, the target having a specified configuration suitable for a sensor calibration; and
a handlebar frame operable to detachably couple to the base frame by engaging the second bracket, the handlebar frame comprising a primary handlebar member, and a secondary handlebar member transversely affixed to the primary handlebar member within a specified tolerance.

2. The sensor calibration device of claim 1, wherein the handlebar frame further comprises a tablet mount configured to support a tablet computing device.

3. The sensor calibration device of claim 1, wherein the base frame further comprises a number of wheels.

4. The sensor calibration device of claim 1, Wherein the base frame further comprises a handlebar frame lock operable to fix the handlebar frame to the base frame.

5. The sensor calibration device of claim 4, wherein the second bracket comprises the handlebar frame lock.

6. The sensor calibration device of claim 1, wherein the handlebar frame further comprises a foot operable to restrict motion of the sensor calibration device when the sensor calibration device is functionally-assembled.

7. The sensor calibration device of claim 6, wherein the foot is configured to selectively restrict motion of the sensor calibration device when the sensor calibration device is functionally-assembled.

8. The sensor calibration device of claim 7, wherein the handlebar frame further comprises a lock handle operable to control the foot to selectively restrict motion of the sensor calibration device.

9. The sensor calibration device of claim 8, wherein a column-and-spring assembly connects the lock handle and the foot, the column-and-spring assembly is at least partially housed inside the primary handlebar member.

10. The sensor calibration device of claim 9, wherein the column-and-spring assembly provides a braking force to the foot that is calibrated to a specified force value corresponding to the weight of the sensor calibration device when functionally-assembled.

\* \* \* \* \*